US009710210B2

(12) United States Patent
Ban

(10) Patent No.: US 9,710,210 B2
(45) Date of Patent: Jul. 18, 2017

(54) IMAGE FORMING SYSTEM, INFORMATION PROCESSING DEVICE, TALLY INFORMATION TRANSMISSION METHOD, AND NON-TRANSITORY COMPUTER READABLE RECORDING MEDIUM

(71) Applicant: KONICA MINOLTA, INC., Chiyoda-ku (JP)

(72) Inventor: Shinichi Ban, Kobe (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 106 days.

(21) Appl. No.: 14/614,825

(22) Filed: Feb. 5, 2015

(65) Prior Publication Data
US 2015/0242175 A1 Aug. 27, 2015

(30) Foreign Application Priority Data
Feb. 21, 2014 (JP) ................................ 2014-031331

(51) Int. Cl.
*G06K 5/00* (2006.01)
*G06F 3/12* (2006.01)

(52) U.S. Cl.
CPC .......... *G06F 3/1273* (2013.01); *G06F 3/1205* (2013.01); *G06F 3/1263* (2013.01)

(58) Field of Classification Search
CPC ............................ G06Q 20/20; G06Q 20/201
(Continued)

(56) References Cited

U.S. PATENT DOCUMENTS 8,531,688 B2 * 9/2013 Okada ................ G03G 15/5091
358/1.1
8,970,878 B2 * 3/2015 Kakegawa ............ G06F 3/1208
358/1.15
(Continued)

FOREIGN PATENT DOCUMENTS

JP 2009-301108 A 12/2009
JP 2010-221697 A 10/2010
(Continued)

OTHER PUBLICATIONS

Office Action (Decision of Refusal) issued on May 31, 2016, by the Japanese Patent Office in Japanese Patent Application No. JP2014-031331, and an English Translation of the Office Action. (10 pages).
(Continued)

*Primary Examiner* — Daniel St Cyr
(74) *Attorney, Agent, or Firm* — Buchanan Ingersoll & Rooney PC

(57) ABSTRACT

An image forming system that allows communication with a tally service server over a network, comprises: an image forming device configured to execute a job; and a control device which applies a setting configured by a user to the image forming device, and causes the image forming device to execute the job with applying the setting. The control device includes: a setting value arranging part configured to arrange setting values of multiple setting items relating to the job in a predetermined order and combining into one piece, thereby generating setting value array information; a tally information generating part configured to generate tally information in which at least one piece of the setting value array information generated by the setting value arranging part is set as one tally item; and a transmission part configured to send the tally information generated by the tally information generating part to the tally service server.

28 Claims, 14 Drawing Sheets

(58) Field of Classification Search
USPC .................................................. 235/380, 383
See application file for complete search history.

(56) References Cited

U.S. PATENT DOCUMENTS

| | | | |
|---|---|---|---|
| 9,071,777 B2* | 6/2015 | Kazama | ............. H04N 1/33369 |
| 2009/0303547 A1 | 12/2009 | Kurihara | |
| 2011/0273738 A1 | 11/2011 | Tanaka et al. | |
| 2011/0299106 A1 | 12/2011 | Mori | |
| 2012/0200883 A1 | 8/2012 | Ikari | |

FOREIGN PATENT DOCUMENTS

| | | |
|---|---|---|
| JP | 2011-257856 A | 12/2011 |
| JP | 2012-162037 A | 8/2012 |

OTHER PUBLICATIONS

Office Action issued on Dec. 22, 2015, by the Japanese Patent Office in corresponding Japanese Patent Application No. 2014-031331, and an English Translation of the Office Action. (9 pages).

* cited by examiner

FIG. 6

|  | COMMON SETTING ITEM | NOT COMMON SETTING ITEM |
|--|---------------------|-------------------------|

| INDEX | 1 | 2 | 3 | 4 | 5 | 6 | 7 | 8 | 9 | 10 | 11 | 12 | 13 | 14 | 15 | 16 | 17 | 18 |
|-------|---|---|---|---|---|---|---|---|---|----|----|----|----|----|----|----|----|----|
| SETTING VALUE | 1 | 0 | 1 | 1 | 0 | 1 | 2 | 2 | 1 | 1 | 0 | 1 | 0 | 0 | 1 | 0 | 2 | 0 |

HEAD ... END ~DL

FIG. 7

| INDEX | SETTING ITEM | SETTING VALUE | DETAIL OF SETTING |
|---|---|---|---|
| 1 | AUTHENTICATION METHOD | 0 | NO AUTHENTICATION |
| | | 1 | AUTHENTICATION ON MAIN BODY |
| | | 2 | AUTHENTICATION ON SERVER |
| 2 | COLOR SETTING | 0 | BLACK AND WHITE |
| | | 1 | FULL-COLOR |
| | | 2 | SINGLE COLOR |
| 3 | SHEET SIZE | 0 | A4 |
| | | 1 | A3 |
| | | 2 | A5 |
| | | 3 | B4 |
| ⋮ | ⋮ | ⋮ | ⋮ |
| 18 | STAPLE | 0 | NO |
| | | 1 | UPPER LEFT |

FIG. 10

STORED INFORMATION D3

| PRINK JOB | | | | | | | | | | | | | | | | | |
|---|---|---|---|---|---|---|---|---|---|---|---|---|---|---|---|---|---|
| LABEL | | | | | | | | | | | | | | | | | COUNT VALUE |
| 0 | 0 | 1 | 1 | 0 | 1 | 2 | 2 | 1 | 1 | 0 | 1 | 0 | 0 | 1 | 0 | 2 | 0 | 1 |
| 1 | 0 | 1 | 1 | 0 | 1 | 2 | 2 | 1 | 1 | 0 | 1 | 0 | 0 | 1 | 0 | 2 | 0 | 1 |
| 2 | 0 | 1 | 1 | 0 | 1 | 2 | 2 | 1 | 1 | 0 | 1 | 0 | 0 | 1 | 0 | 2 | 0 | 2 |
| 0 | 1 | 1 | 1 | 0 | 1 | 2 | 2 | 1 | 1 | 0 | 1 | 0 | 0 | 1 | 0 | 2 | 0 | 1 |
| 1 | 1 | 1 | 1 | 0 | 1 | 2 | 2 | 1 | 1 | 0 | 1 | 0 | 0 | 1 | 0 | 2 | 0 | 3 |
| 2 | 1 | 1 | 1 | 0 | 1 | 2 | 2 | 1 | 1 | 0 | 1 | 0 | 0 | 1 | 0 | 2 | 0 | 2 |
| ⋮ | | | | | | | | | | | | | | | | | | ⋮ |

# IMAGE FORMING SYSTEM, INFORMATION PROCESSING DEVICE, TALLY INFORMATION TRANSMISSION METHOD, AND NON-TRANSITORY COMPUTER READABLE RECORDING MEDIUM

This application is based on the application No. 2014-031331 filed in Japan, the contents of which are hereby incorporated by reference.

BACKGROUND OF THE INVENTION

Field of the Invention

The present invention relates to an image forming system, an information processing device, a tally information transmission method and a non-transitory computer readable recording medium. The present invention more specifically relates to a technique of causing a tally service server installed on an internet, for instance, to tally up information as to a job executed on the image forming device.

Description of the Background Art

Conventional image forming devices which produce printed outputs based on print jobs store the print job received across the network, for example. In response to receiving change information to change print setting information in the print job, the image forming devices change the print setting information of the stored print job based on the received change information. This known technique is introduced for example in Japanese Patent Application Laid-Open No. JP 2010-221697 A. According to this known technique, the print setting information set by a user is stored on the image forming device together with the print jobs. The print setting information stored with the print jobs is not used for tallying up data such as usage by the user.

In recent years, portable information processing devices such as smart phones and tablet terminals have become popular. With this popularity, dedicated applications which are to be installed on the portable information processing devices are provided. With boot of the dedicated application on the portable information processing device, a job is allowed to be sent to the image forming device from the portable information processing device. For sending the job to the image forming device from the portable information processing device, the user makes a setting operation relating to print settings on a job setting screen displayed by the dedicated application. The user gives a job execution instruction after making the setting operation, then the job including setting information relating to the print settings is sent to the image forming device. As a result, the user is allowed to make the image forming device execute the print job.

A screen size of the portable information processing device is relatively smaller than a screen size of devices such as general personal computers. Thus, it is difficult to show many setting items that may be configured by the user when he or she gives the job to the image forming device on one screen. Also, when the user gives the job by using the portable information processing device, it is rare to have the print settings fully utilizing a wide variety of functions included in the image forming device. In many cases, the print settings using only the basic function on the image forming device are configured. For developing the dedicated application to be installed on the portable information processing device, it is required to construct a user interface which is easy for many users to use. The user interface which is easy for many users to use may be realized by keeping setting items highly used by many users in one screen and constructing a main job setting screen, for example.

In order to construct the user interface which is easy for the user who is using the portable information processing device, it is necessary to design the job setting screen by figuring out in detail what kind of the change does the user make on which setting item of many setting items those may be configured by the user when each user actually uses the portable information processing device to send the print job. A function to establish communication with the tally service server on a cloud such as "Google Analytics" from Google may be equipped with the dedicated application installed on the portable information processing device, and the usage by each user may be tallied up on the tally service server. In such a case, after the user boots the dedicated application and sends the job to the image forming device, the dedicated application sends the setting information as to the job configured by the user to the tally service server. As a result, the setting information configured when the jobs were sent to the image forming device by the various types of users via the portable information processing devices is stored on the tally service server on the cloud. Especially the setting information sent from the portable information processing devices used by the users from all over the world may be tallied up on the tally service server on the cloud. Hence, applications such as version upgrade of the dedicated application may be developed after figuring out the usage by many users.

The generally used tally service server such as aforementioned "Google Analytics" counts up a count value for each tally item set as a label in tally information received over the network, thereby keeping a tally. The portable information processing device generates the tally information including the label. The setting value of each setting item configurable by each user is set as the label. The portable information processing device sends the generated tally information to the tally service server so that the setting values which are set by the variety of users are allowed to be tallied for each setting item on the tally service server. It is assumed, for example, the user sets the printings in both-sided, two pages on a single sheet and in black and white. In this case, the portable information processing device sends the tally information which includes the label as which each of the printings in both-sided, two pages on the single sheet and in black and white is set to the tally service server. "1" is added to the count value corresponding to each of three tally items corresponding to the printings in both-sided, two pages on the single sheet and in black and white on the tally service server. The user may send the job to the image forming device with using the portable information processing device. In such a case, the tally service server is allowed to tally up for each setting item what setting is configured by the user in detail for each of many setting items.

A fee for the usage of the tally service server is charged generally depending on the number of hits on the label, in other words, the count value of the tally item set as the label. As described above, the tally information which includes the label as which the setting value for each setting item configurable by the user is set is sent to the tally service server. In such a case, the count value of the setting value of each setting item reaches extremely large number. The fee charged by the tally service server becomes expensive. The general tally service server for figuring out the usage by many users is not easy to be used.

SUMMARY OF THE INVENTION

The present invention is intended to solve the above problems. Thus, the present invention is intended to provide an image forming system, an information processing device, a tally information transmission method and a non-transitory computer readable recording medium capable of sending tally information in a way relatively easy to be used even with a general tally service server.

First, the present invention is directed to an image forming system that allows communication with a tally service server over a network. The tally service server adds a predetermined count-up value to a count value for each tally item included in tally information received over the network, thereby keeping a tally.

According to an aspect of the image forming system, the image forming system comprises: an image forming device configured to execute a job; and a control device which applies a setting configured by a user to the image forming device, and causes the image forming device to execute the job with applying the setting. The control device includes: a setting value arranging part configured to arrange setting values of multiple setting items relating to the job in a predetermined order and combining into one piece, thereby generating setting value array information in response to causing the image forming device to execute the job; a tally information generating part configured to generate tally information in which at least one piece of the setting value array information generated by the setting value arranging part is set as one tally item; and a transmission part configured to send the tally information generated by the tally information generating part to the tally service server.

Second, the present invention is directed to a information processing device which is capable of establishing communication with an image forming device which executes a job sends tally information to a tally service server that adds on a predetermined count-up value to a count value for each tally item included in the tally information, thereby keeping a tally when causing the image forming device to execute the job with applying a setting configured by a user to the image forming device.

According to one aspect of the communication terminal information processing device, the information processing device comprises: a setting value arranging part configured to arrange setting values of multiple setting items relating to the job in a predetermined order and combining into one piece, thereby generating setting value array information in response to causing the image forming device to execute the job; a tally information generating part configured to generate the tally information in which at least one piece of the setting value array information generated by the setting value arranging part is set as one tally item; and a transmission part configured to send the tally information generated by the tally information generating part to the tally service server.

Third, the present invention is directed to a tally information transmission method of sending tally information to a tally service server which adds on a predetermined count-up value to a count value for each tally item included in the tally information, thereby keeping a tally when an information processing device which is capable of establishing a communication with an image forming device which executes a job applies a setting configured by a user to the image forming device and causes the image forming device to execute the job.

According to one aspect of the tally information transmission method, the tally information transmission method comprises the steps of: (a) arranging setting values of multiple setting items relating to the job in a predetermined order and combining into one piece, thereby generating setting value array information in response to execution of the job by the image forming device; (b) generating the tally information in which at least one piece of the setting value array information generated in the step (a) is set as one tally item; and (c) sending the tally information generated in the step (b) to the tally service server.

Forth, the present invention is directed to a non-transitory computer readable recording medium on which a program is recorded. The program is executable on an information processing device capable of establishing a communication with an image forming device which executes a job, and sending tally information to a tally service server which adds on a predetermined count-up value to a count value for each tally item included in the tally information, thereby keeping a tally when the information processing device applies a setting configured by a user to the image forming device and causes the image forming device to execute the job.

According to an aspect of the non-transitory computer readable recording medium, the program causes the information processing device to execute the steps of: (a) arranging setting values of multiple setting items relating to the job in a predetermined order and combining into one piece, thereby generating setting value array information in response to execution of the job by the image forming device; (b) generating the tally information in which at least one piece of the setting value array information generated in the step (a) is set as one tally item; and (c) sending the tally information generated in the step (b) to the tally service server.

BRIEF DESCRIPTION OF THE DRAWINGS

FIG. 6 is an example of data structure of setting value array information;

FIG. 7 is an example of a table defining a correspondency between an index and a setting value;

FIG. 10 is an example of stored information;

DESCRIPTION OF THE PRESENT PREFERRED EMBODIMENTS

Figure 1:
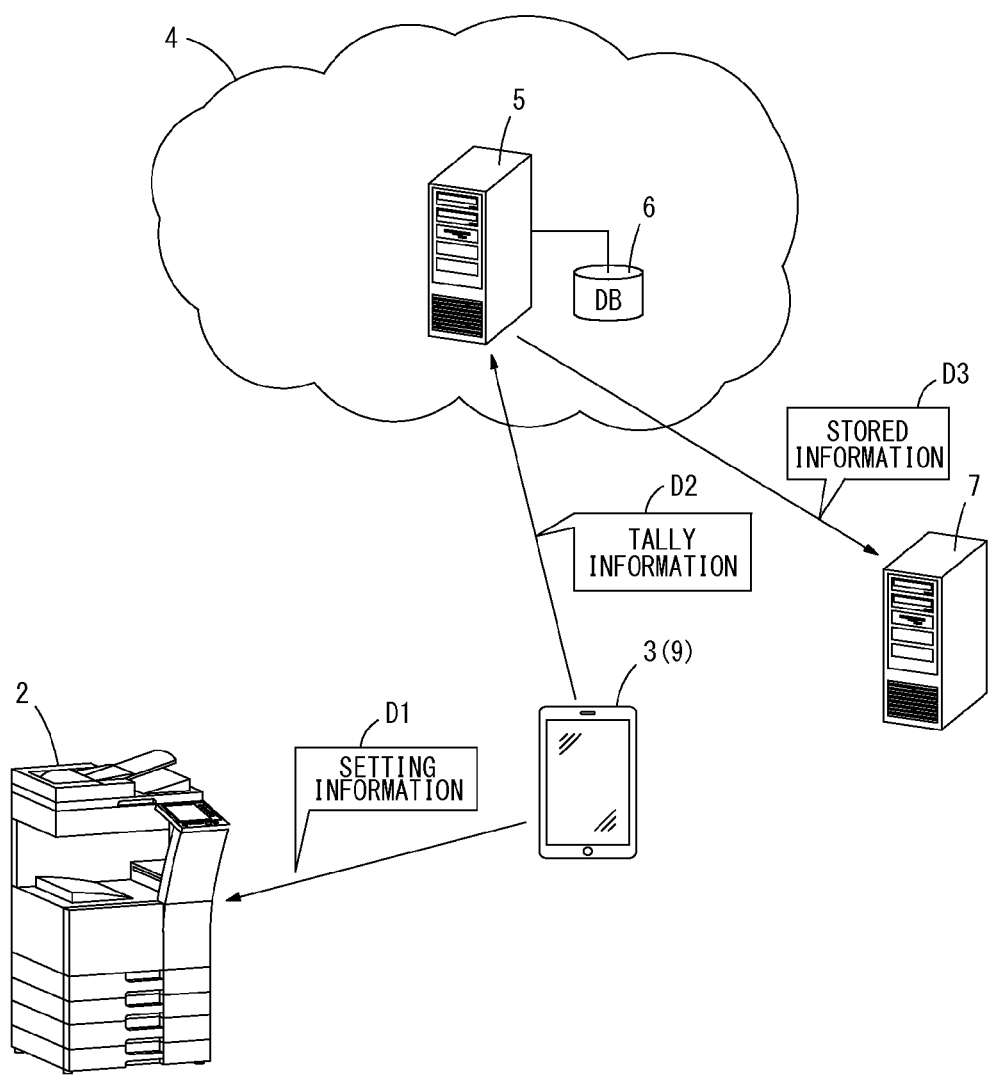
FIG. 1 shows an exemplary configuration of an image forming system.

Preferred embodiments of the present invention are described in detail below with reference to figures. In the description given below, those elements which are shared in common among figures are represented by the same reference numerals, and these elements are not discussed repeatedly for the same description.

(First Preferred Embodiment)

FIG. 1 shows an exemplary configuration of an image forming system 1 of the first preferred embodiment. The image forming system 1 comprises an image forming device 2 formed from a device such as one of MFPs and a portable information processing device 3 formed from a device such as a smart phone or a tablet terminal. On the image forming system 1, the image forming device 2 and the portable information processing device 3 are allowed to establish communication therebetween across a network such as a LAN (Local Area Network) which is not shown in FIG. 1. The information processing device 3 is capable of accessing an internet 4 over the network or a cell phone network. The portable information processing device 3 is allowed to establish communication with a tally service server 5 installed on the internet 4.

The image forming device 2 having multiple functions including print, scan and fax function, for example, executes a job relating to the function selected by a user. For executing the job, the image forming device 2 applies a setting configured by the user and executes the job. In response to receiving the print job across the network, for example, the image forming device 2 applies the setting configured by the user and produces a printed output based on setting information attached to the print job.

The information processing device 3 is a device owned by an individual user, for example. The information processing device 3 stores therein a dedicated application program for working together with the image forming device 2 installed in advance. By booting the application program, the information processing device 3 applies the setting relating to the job configured by the user to the image forming device 2 and serves as a control device 9 which causes the image forming device 2 to execute the job with applying the setting. To be more specific, the information processing device 3 serves as the control device 9 by booting the dedicated application program, and is allowed to give the print job to the image forming device 2 over the network. In this case, the information processing device 3 generates setting information D1 based on a user setting operation, and sends the print job including the generated setting information D1 to the image forming device 2. The image forming device 2 configures the print setting based on the setting information received from the information processing device 3, then obtains image data specified by the user, thereby producing the printed output. For sending the print job to the image forming device 2 from the information processing device 3, the image data based on which the printed output is produced may be sent to the image forming device 2 from the information processing device 3 together with the setting information D1. The image data is not necessarily sent with the setting information D1. The information processing device 3 may designate the image data stored on another device on the network as the one to print, thereby causing the image forming device 2 to obtain the image data.

The job sent to the image forming device 2 as the information processing device 3 serves as the control device 9 is not limited to the print job. More specifically, the information processing device 3 is allowed to send the job such as the scan job or the fax job to the image forming device 2. In such a case, the user gives an instruction to boot the dedicated application program on the information processing device 3 and selects the scan function or the fax function so that he or she is allowed to configure the setting relating to the scan job or the fax job. After a job execution instruction is given by the user, the information processing device 3 sends the setting information D1 to the image forming device 2, thereby causing the image forming device 2 to execute the scan job or the fax job.

The information processing device 3 serves as the control device 9 to send the job to the image forming device 2. With sending the job, the information processing device 3 generates tally information D2 containing the setting information D1 relating to the job and sends the generated tally information D2 to the tally service server 5.

The tally service server 5 is a generally used server such as "Google Analytics" from Google, for instance. The tally service server 5 keeps a tally by receiving the tally information D2 from the information processing devices 3 owned by the respective users in all over the world. The tally service server 5, however, is not necessarily the server generally used. The tally service server 5 may be a server which is installed specially on the image forming system 1. The tally service server 5 includes a database 6 in which the tally information D2 is stored. In response to receiving the tally information D2 from the information processing device 3, the tally service server 5 registers and stores the received tally information D2 in the database 6. The tally service server 5 registers a tally item set as a label in the tally information D2 with the database 6 and adds on "1" to a count value corresponding to the tally item, thereby tallying up the count value. It is assumed, for example, the tally information D2 in which the tally item which is the same as the tally item already registered with the database 6 is set as the label is received. In such a case, the tally service server 5 adds on "1" to the count value corresponding to the tally item which is already registered without creating a new tally item. To be more specific, the tally service server 5 collects much tally information D2 from the variety of information processing devices 3. In response to receiving the tally information D2 in which the same tally item is set as the label, the tally service server 5 adds on "1" to the count value of the tally item corresponding to the label. The tally information D2 in which the different tally item is set as the label, the tally service server 5 counts as the different tally item. "1" is added on to the count value, however the value is not necessarily "1". The predetermined value which is added on the tally service server 5 may be specified with the tally information D2.

When the job is sent to the image forming device 2 from the information processing device 3, the tally service server 5 is used to keep a tally to figure out how does each user uses the image forming device 2. The tally service server 5 stores the setting information D1 relating to the job which is configured by each user by putting the information processing device 3 into operation to serve as the control device 9. Stored information D3 stored on the tally service server 5 is downloaded to an analysis device 7 which is installed separately from the tally service server 5, for instance, on a regular or irregular basis. The analysis device 7 is placed at a development center of the application program installed on the information processing device 3, for example. The analysis device 7 obtains the stored information D3 on the tally service server 5 and analyzes data such as usage by each user. The analysis device 7 is capable of extracting the setting item the setting value of which is frequently changed from a default value by the user of the many setting items configurable by the user when the user sends the job to the image forming device 2 with using the information processing device 3, for example. Also, the analysis device 7 is capable of extracting the setting value corresponding to the setting item which has been changed from the default value. Furthermore, the analysis device 7 is allowed to perform a variety of process.

For sending the tally information D2 to the tally service server 5 in response to sending the job to the image forming device 2, the information processing device 3 serving as the control device 9 on the image forming system 1 having the above-described configuration generates the tally information D2 which controls not to have an extremely increase in the count value for each tally item managed by the tally service server 5, and sends the generated tally information D2 to the tally service server 5. The information processing device 3 is described in detail below.

Figure 2:
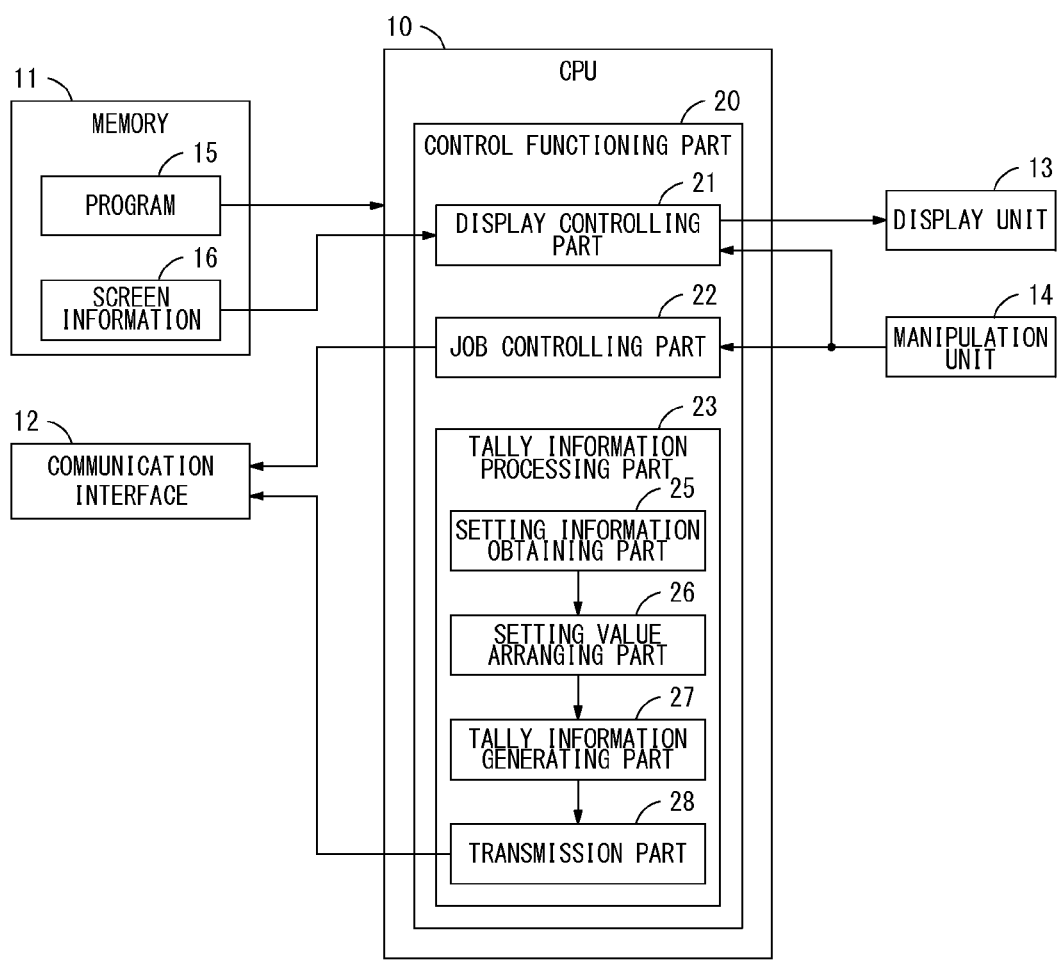
FIG. 2 is a block diagram showing an exemplary hardware configuration and functional configuration of an information processing device.

FIG. 2 is a block diagram showing an exemplary hardware configuration and functional configuration of the information processing device 3. The information processing device 3 includes a CPU 10, a memory 11, a communication interface 12, a display unit 13 and a manipulation unit 14. The CPU 10 executes various types of programs stored in the memory 11, thereby controlling operations of each processing part. The memory 11 is formed from a nonvolatile storage device such as a solid state drive (SSD), for instance. The memory 11 stores therein a variety of programs and/or data. The communication interface 12 establishes a wired or radio communication. The communication interface 12 allows the communication between the information processing device 3 and the image forming device 2 or the tally service server 5 by connecting the information processing device 3 to the network. The display unit 13 displays various types of images on the screen is formed from a device such as a color liquid crystal display, for example. The manipulation unit 14 formed with parts such as touch panel sensors arranged on the screen of the display unit 13, for example, detects operation by the user.

The memory 11 stores therein an application program (hereafter, program) 15 specialized for working together with the image forming device 2 and screen information referred when the program 15 is executed. The program 15 and the screen information 16 are installed in advance. The information processing device 3 obtains the program 15 and the screen information 16 by downloading them over the internet 4, for example, and installs on the memory 11.

In response to detecting a startup instruction of the program 15 by the user based on the information received from the manipulation unit 14, the CPU 10 reads and executes the program 15 in the memory 11. The CPU 10 then serves as a control functioning part 20 to cause the information processing device 3 to serve as the control device 9. To be more specific, the control functioning part 20 applies the setting configured by the user to the image forming device 2 over the network 2. Also, the control functioning part 20 causes the image forming device 2 to execute the job as applying the setting. The control functioning part 20 includes a display controlling part 21, a job controlling part 22 and a tally information processing part 23.

The display controlling part 21 controls the screen displayed on the display unit 13. After the boot of the program 15, the display controlling part 21 reads the screen information 16 in the memory 11, and displays an initial screen on the display unit 13 based on the read screen information 16. As the initial screen is being displayed, the user is allowed to select the print, scan or fax function from among the multiple functions, for example. After the user makes the operation to select the function, the display controlling part 21 displays a job setting screen relating to the function selected by the user on the display unit 13 based on the screen information 16. As the job setting screen is being displayed, the user is allowed to make the operation to configure the setting of the job relating to the function selected by the user. Multiple setting items configurable by the user are shown on the job setting screen. As the job setting screen is displayed on the display unit 13, the user is allowed to input any setting value for each setting item. The information processing device 3 may be the smart phone or the tablet terminal. In such a case, the screen size of the display unit 13 is smaller than the screen size of the general personal computer. All of the multiple setting items configurable by the user may not be displayed in one screen. Hence, in this case, the display controlling part 21 causes the job setting screen to be formed from multiple pages, and the setting item displayed in the screen may be changed based on a page switching operation by the user. After the setting operation is made by the user, the display controlling part 21 applies the setting value configured by the user to the job setting screen and updates.

The job controlling part 22 sends the job to the image forming device 2 in response to receiving the user instruction. In response to detecting the job execution instruction by the user, the job controlling part 22, for instance, obtains the current setting value of the respective setting items and generates the setting information D1 to send to the image forming device 2. By sending the setting information D1 to the image forming device 2 via the communication interface 12, the job controlling part 22 sends the job to the image forming device 2. If the job given by the user is the print job, the image data based on which the printed output is to be produced may be attached to the job.

After the job is given to the image forming device 2, the tally information processing part 23 generates the tally information D2 containing the setting information D1 relating to the job and sends the tally information D2 to the tally service server 5 via the communication interface 12. The tally information processing part 23 includes a setting information obtaining part 25, a setting value arranging part 26, a tally information generating part 27 and transmission part 28. The tally information processing part 23 puts each processing part into operation to function one after the other. The setting information obtaining part 25 obtains the setting information D1 generated by the job controlling part 22. After obtaining the setting information D1 from the job controlling part 22, the setting information obtaining part 25 extracts the setting value corresponding to the respective setting items configurable by the user from the setting information D1. The setting value arranging part 26 generates setting value array information. The setting value array information is information in which each setting value corresponding to each of the setting items is arranged in a predetermined order and combined into one piece. The setting value array information is explained in detail later. By setting the setting value array information generated by the setting value arranging part 26 as the label, the tally information generating part 27 generates the tally information D2 in which the setting value array information is set as one tally item. The transmission part 28 sends the tally information D2 generated by the tally information generating part 27 to the tally service server 5 via the communication interface 12.

Figure 3:
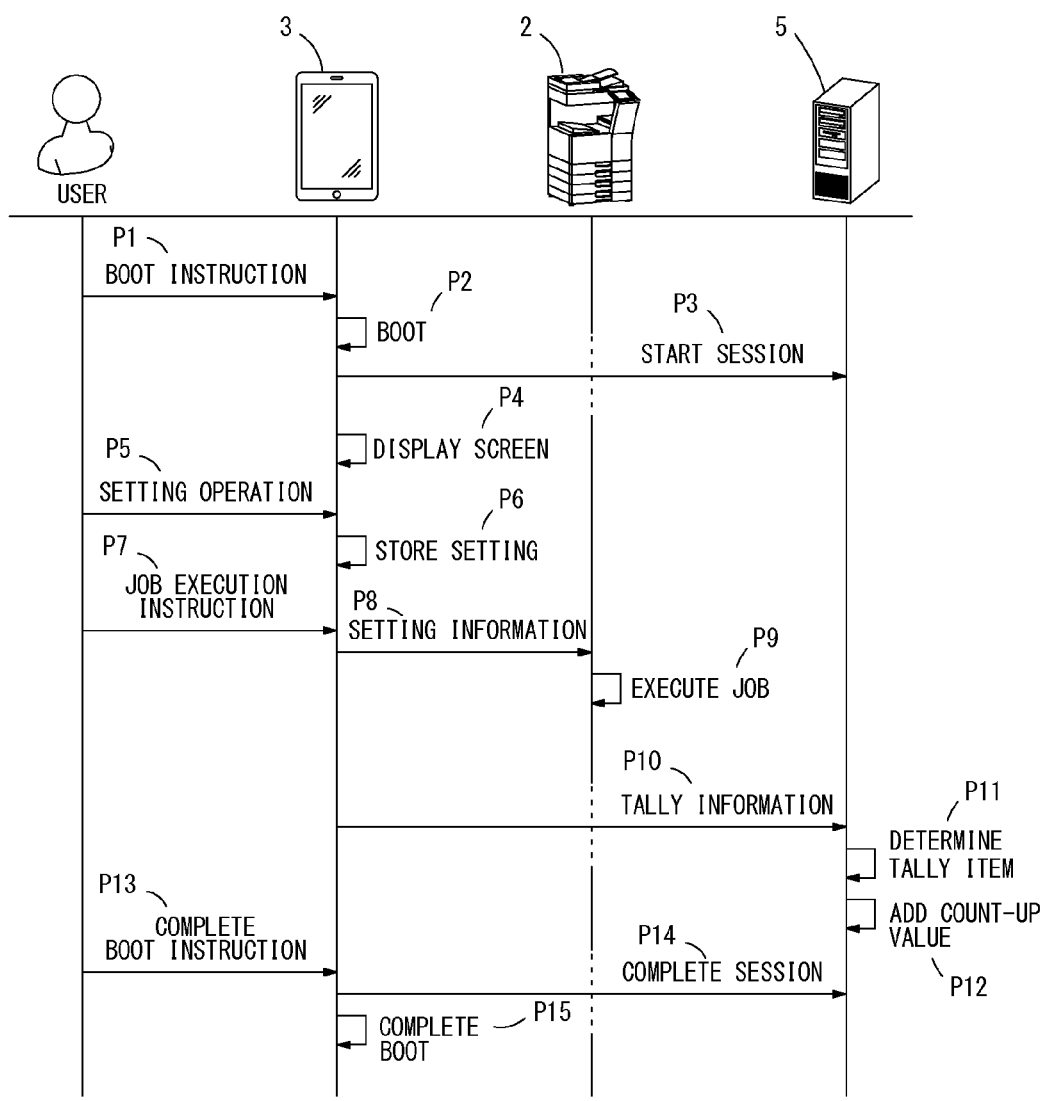
FIG. 3 is a flow diagram explaining an exemplary sequential procedure performed when the job is sent to an image forming device from the information processing device.

FIG. 3 is a flow diagram explaining an exemplary sequential procedure performed when the job is sent to the image forming device 2 from the information processing device 3. After the instruction to boot the program 15 is given by the user to the information processing device 3 (process P1), the information processing device 3 boots the program 15 and puts the control functioning part 20 into operation to function (process P2). After the control functioning part 20 is put into operation to function on the information processing device 3, the tally information processing part 23 becomes operative. The tally information processing part 23 accesses the tally service server 5 over the internet 4 and starts session with the tally service server 5 (process P3). Almost at the same time, the display controlling part 21 becomes operative on the control functioning part 20. The display controlling part 21 displays the screen for the user to make the operation to select the function or the setting operation of the job on the display unit 13 of the information processing device 3 (process P4). After the user makes the setting operation of the job with the information processing device 3 (process P5), the display controlling part 21 stores the setting and updates the job setting screen (process P6). In response to receiving the job execution instruction by the user (process P7), the job controlling part 22 sends the setting information D1 to the image forming device 2 to send the job (process P8). As described above, the image forming device 2 executes the job given by the user (process P9).

With transmission of the job to the image forming device 2, the tally information processing part 23 generates the tally information D2 based on the setting information D1 sent to the image forming device 2, then sends the generated tally information D2 to the tally service server 5 (process P10). In response to receiving the tally information D2 from the information processing device 3, the tally service server 5 determines the tally item based on the information set as the label in the tally information D2 (process P11). The tally service server 5 then adds on "1" to the count value corresponding to the tally item (process P12). The information set as the label in the tally information D2 may be new. In such a case, the tally service server 5 adds the new tally item corresponding to the label with the database 6, and sets the count value of the added tally item as an initial value (for instance, "1"). The information set as the label in the tally information D2 may be the information already registered as the tally item with the database 6. In this case, the tally service server 5 adds on "1" to the count value of the tally item.

In response to detecting the instruction to complete boot of the program 15 by the user (process P13), the tally information processing part 23 completes the session with the tally service server 5 (process P14). The information processing device 3 then completes boot of the program 15 (process P15).

Figure 4:
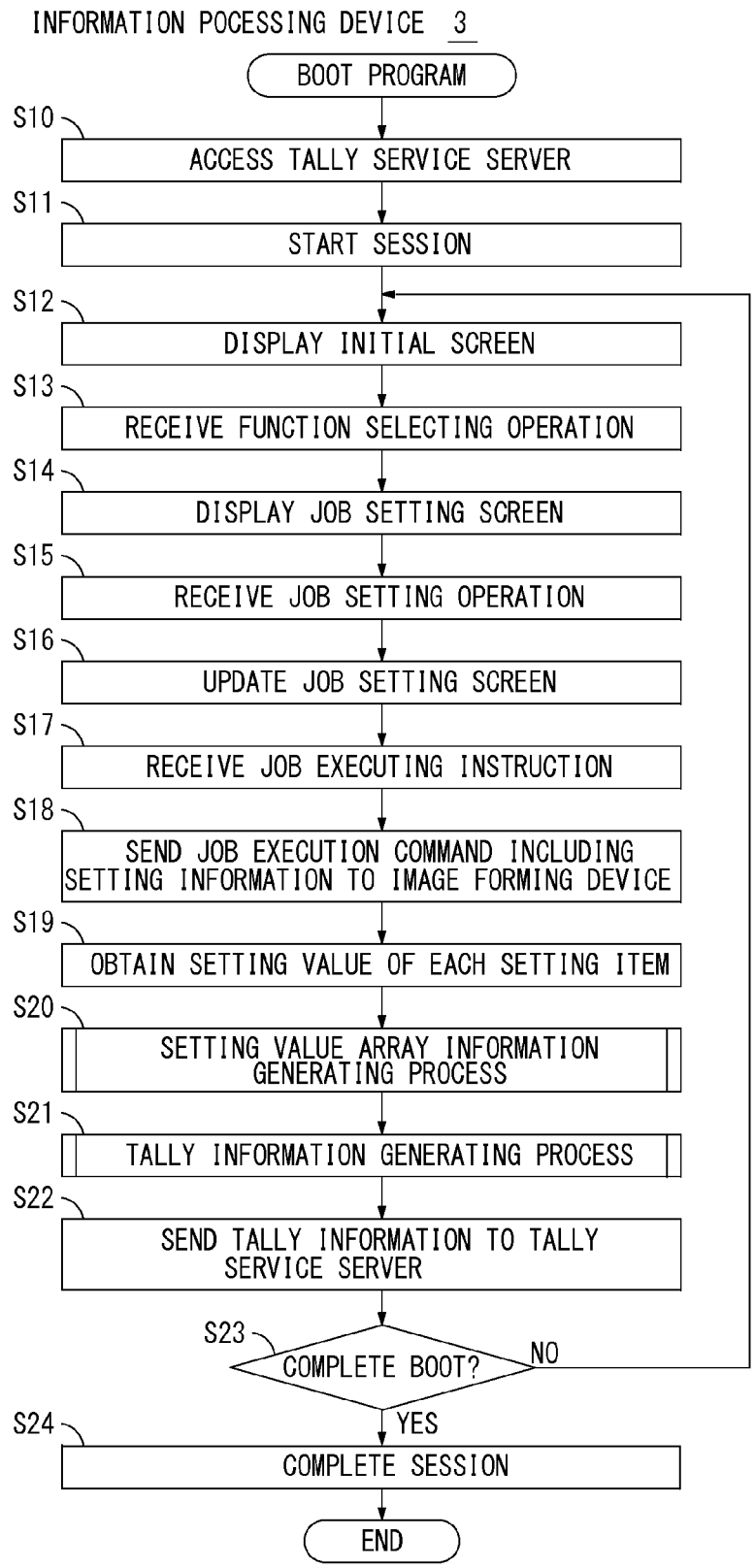
FIG. 4 is a flow diagram explaining an exemplary sequential procedure of the main process performed on the information processing device.

Detailed sequential procedure of the process performed when the control functioning part 20 becomes operative on the information processing device 3 is described next. FIG. 4 is a flow diagram explaining an exemplary sequential procedure of the main process performed on the information processing device 3. This process is performed when the program 15 is booted and the control functioning part 20 becomes operative on the information processing device 3. Upon the start of the process, the control functioning part 20 brings the tally information processing part 23 into operation to access the address designated in advance, thereby accessing the tally service server 5 (step S10) to start the session with the tally service server 5 (step S11). The display controlling part 21 is then brought into operation to function to display the initial screen on the display unit 13 (step S12). The display controlling part 21 then receives the user operation to select the function (step S13). After one of the functions is selected by the user, the display controlling part 21 displays the job setting screen relating to the selected function on display unit 13 (step S14), and receives the user operation to configure the setting of the job (step S15). In response to detecting the setting operation by the user for each setting item configurable by the user, the display controlling part 21 stores the setting value and updates the job setting screen to the one to which the job setting operation by the user is applied (step S16). After the job setting screen is updated, the job execution instruction by the user may be detected (step S17). In this case, the job controlling part 22 is brought into operation to function. The job controlling part 22 sends a job execution command containing the setting information D1 to the image forming device 2 (step S18).

The setting information obtaining part 25 of the tally information processing part 23 is then brought into operation to function on the information processing device 3. The setting information obtaining part 25 obtains the setting value of each setting item contained in the setting information D1 sent from the image forming device 2 (step S19). Every setting value configured by the user at giving the job execution instruction for each of the multiple setting items configurable by the user is allowed to be obtained. The setting value arranging part 26 is brought into operation to function to perform a setting value array information generating process (step S20).

Figure 5:
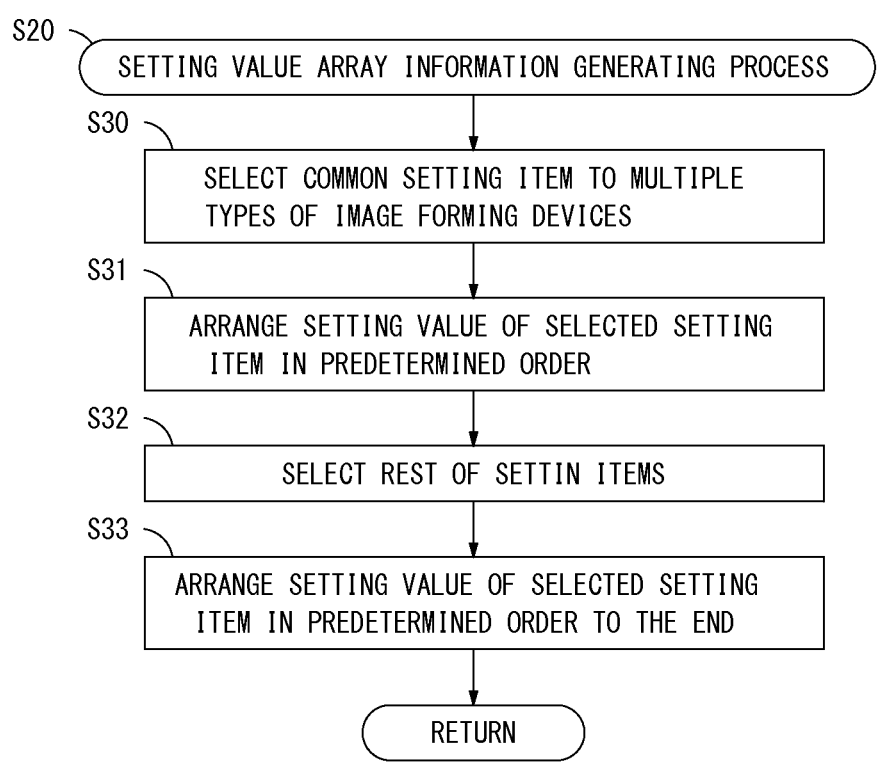
FIG. 5 is a flow diagram explaining the detailed exemplary sequential procedure of a setting value array information generating process.

FIG. 5 is a flow diagram explaining the detailed exemplary sequential procedure of the setting value array information generating process (step S20). Upon the start of the process, the setting value arranging part 26 selects the common setting item to multiple types of the image forming devices 2 among the multiple setting items configurable by the user (step S30). The common setting item to multiple types of the image forming devices 2 is the setting item relating to the common function to the multiple types of the image forming devices 2 and is basic setting item relating to the job. The basic setting item relating to the common function to the multiple types of the image forming devices 2 for the print job, for instance, is the setting item such as the setting item of print type to set 2-sided or 1-sided, the setting item of page allocation to set whether or not to print two pages on a single sheet and the setting item of color selection to set print in color or black and white. To be more specific, the setting value arranging part 26 selects all the basic setting items relating to the job received to the image forming device 2 in step S30. The setting item relating to the unique function of the image forming device 2 to which the print job is sent is not selected in step S30. The unique function of the image forming device 2 is the function not common to the multiple types of the image forming devices 2, and is the optional function such as stapling or biding, for instance. The setting value arranging part 26 arranges the setting value of the setting item selected in step S30 in a predetermined order (step S31). Thus, character string data or bit string data in which the setting value configured by the user for each common setting item to the multiple types of the image forming devices 2 is arranged in the predetermined order is generated.

The setting value arranging part 26 selects the rest of the setting item not selected in step S30 (step S32). The setting item not common to the multiple types of the image forming devices 2 and may be relating to the unique function of the image forming device 2 to which the print job is sent is selected in step S32. The setting item corresponding to the optional function such as stapling or a biding, for instance, as described above is selected. The setting value arranging part 26 arranges the setting value of the setting item selected in step S32 in a predetermined order to the end of the character string data or the bit string data generated in step S31 to combine the data, thereby generating the setting value array information (step S33).

FIG. 6 is an example of a data structure of setting value array information DL generated by the setting value arranging part 26. As illustrated in FIG. 6, the setting value arranging part 26 arranges by embedding the setting value of each setting item in respective data storage regions. A value, for example, increased from "1" one by one is added as an index to the data storage region. The setting value arranging part 26 arranges the setting value of the common setting item to the multiple types of the image forming devices 2 from a head of the index in the predetermined order. All the setting values of the respective common setting items are stored in the data storage regions corresponding to the respective indexes and arranged. The setting value arranging part 26 then arranges the setting value of the not common setting item which is not common to the multiple types of the image forming devices 2 to the end side of the data storage region in the predetermined order. To be more specific, the setting value of one setting item is stored in each index. Also, the setting value of the common setting item is arranged in the predetermined order in the head side of the index, and the setting value of the not common setting item is arranged in the predetermined order in the end side of the index. The data storage region of each index is temporarily created in the memory 11, for example, and in which the setting value described in one byte character or bit may be stored.

FIG. 7 is an example of a table defining a correspondency between the index and the setting value. Although the correspondency for the print job is shown in FIG. 7, the similar correspondency is defined in advance for the other jobs such as the scan job and the fax job. The setting value arranging part 26 refers the table as illustrated in FIG. 7 to specify the setting item corresponding to each index, and arranges the setting value of the specified setting item in the data storage region of each index. In the example of FIG. 7, the setting item "authentication method" is defined for the index "1," and the setting item "color setting" is defined for the index "2." The setting value corresponding to the setting item "authentication method" is stored in the data storage region corresponding to the index "1." The user may configure "no authentication," for instance. In such a case, "0" is stored in the data storage region corresponding to the index "1." The setting value corresponding to the setting item "color setting" is stored in the data storage region corresponding to the index "2." The user may configure "full-color," for instance. In such a case, "1" is stored in the data storage region corresponding to the index "2."

The correspondency between the index and the setting item is defined in advance as described above. For storing the setting values of the respective common setting items and not common setting items in the data storage regions of the respective indexes one by one, the setting value arranging part 26 stores the value in the data storage region defined in advance. There may be no setting value corresponding to the setting item associated with the index. In such a case, the setting value arranging part 26 stores null data in the data storage region.

As a result, the setting value arranging part 26 is allowed to generate the setting value array information DL in a form of character string or bit string with multiple digits. The setting value of each of the multiple setting items is arranged in the predetermined order in the setting value array information DL. The setting value array information DL includes the information in which the setting values of the respective common setting items are stored from the head to a predetermined number of digits, and the information in which the setting values of the respective not common setting items are stored from the predetermined number of digits to the end. The setting value array information DL of FIG. 6 includes 18 digits. The setting values of the respective common setting items are stored from the head to the twelfth digit, and the setting values of the respective not common setting items are stored from the thirteenth to the eighteenth digit. The number of the digits are not necessarily the ones described above.

After the setting value array information generating process (step S20) by the setting value arranging part 26, a tally information generating process (step S21 of FIG. 4) is performed by the tally information generating part 27.

Figure 8:
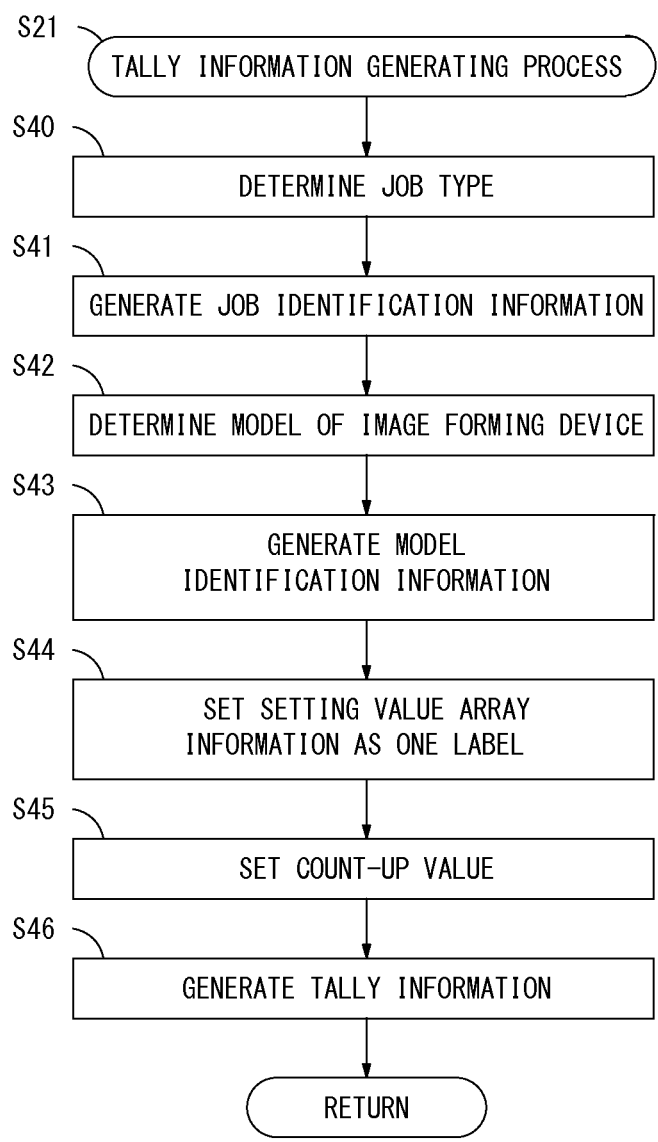
FIG. 8 is a flow diagram explaining the detailed exemplary sequential procedure of a tally information generating process.

FIG. 8 is a flow diagram explaining the detailed exemplary sequential procedure of the tally information generating process (step S21). Upon the start of the process, the tally information generating part 27 determines the type of the job given by the user to the image forming device 2 (step S40). The tally information generating part 27 generates job identification information to identify the job type (step S41). For the print job, for instance, the tally information generating part 27 generates the job identification information corresponding to the print job. The tally information generating part 27 determines the model of the image forming device 2 to which the user has given the job (step S42). The tally information generating part 27 carries out this determination based on the information obtained from the image forming device 2 when the connection with the image forming device 2 is established to send the setting information D1 to the image forming device 2 from the job controlling part 22, for example. After determining the model of the image forming device 2, the tally information generating part 27 generates model identification information for identifying the model of the image forming device 2 (step S43). The tally information generating part 27 then reads the setting value array information DL in the form of character string or bit string in the memory 11 generated by the setting value arranging part 26, and sets the read setting value array information DL as a label, thereby setting as one tally item to be tallied on the tally service server 5 (step S44). The tally information generating part 27 sets the count-up value on the tally service server 5 (step S45). It is assumed that "1" is set as the count-up value, for example. The tally information generating part 27 combines the information generated in steps S41, S43, S44 and S45, thereby generating the tally information D2 to send to the tally service server 5 (step S46).

Figure 9:
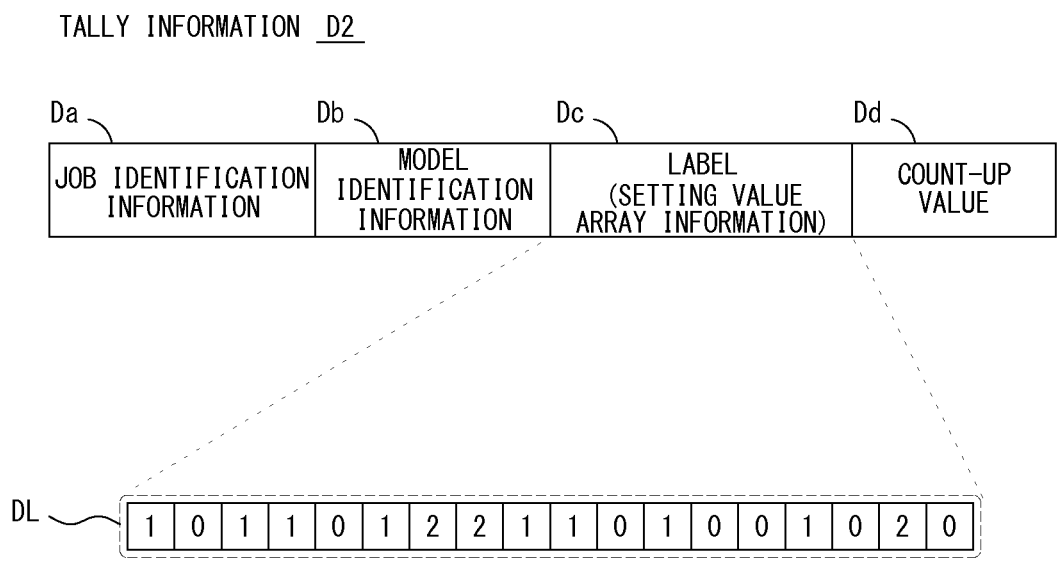
FIG. 9 is an example of data structure of tally information.

FIG. 9 is an example of a data structure of the tally information D2 generated by the tally information generating part 27. As illustrated in FIG. 9, the tally information D2 includes job identification information Da, model identification information Db, a label Dc and a count-up value Dd. The job identification information Da is for identifying the job type which is sent to the image forming device 2 from the information processing device 3. The model identification information Db is for identifying the model of the image forming device 2 to which the job is sent. The label Dc is for causing the tally service server 5 to identify the number of the tally item is one. The setting value array information DL in which the setting value of each of the multiple setting items configurable by the user is arranged in the predetermined order is set as the label Dc as described above. Hence, the tally service server 5 finds the setting value array information DL as one setting item to keep the tally. The count-up value Dd is for specifying the value which is added to the count value corresponding to the label Dc to the tally service server 5. By setting "1" as the count-up value Dd, the value added to the count value of the setting value array information DL including the setting values of the multiple setting items is kept minimized.

Referring back to FIG. 4, after the tally information D2 is generated, the transmission part 28 is brought into operation to function next. The transmission part 28 sends the tally information D2 generated in step S21 to the tally service server 5 (step S22). The control functioning part 20 determines whether not to complete boot of the program 15 (step S23). When the boot of the program 15 is not completed (when a result of step S23 is NO), the control functioning part 20 returns to step S12 to repeat the above-described process. The control functioning part 20 may detect the instruction to complete boot by the user and compete boot of the program 15 (when a result of step S23 is YES), the control functioning part 20 completes the session with the tally service server 5 (step S24) and completes the whole process.

FIG. 10 is an example of the stored information D3 stored in the tally service server 5. As illustrated in FIG. 10, the tally service server 5 gives the count value by taking the setting value array information DL in the form of character string or bit string including the multiple setting values set as the label as one tally item. The character string or bit string setting value array information DL different from the character string or the bit string of the label already registered as the tally item with the tally service server 5 is registered as a new label with the tally service server 5. The count value "1" is given to the new label. It is assumed, for example, that the multiple users give print jobs with which "print in color" is set for the setting item of color selection to the image forming device 2. Even in such a case, if the one or more setting value of the other setting item is different, the setting value array information DL of each print job is taken as the different label and counted on to the different tally item on the tally service server 5. Thus, this may prevent from having an extremely big number of the count value of each tally item on the tally service server 5. The tally service server 5 may charge depending on the count value of the tally item set as the label, for example. Even in this case, the escalating charged amount may be reduced so that the tally service server 5 can be used easily.

The stored information D3 as shown in FIG. 10 is preferably stored separately for each job type on the tally service server 5. That is because the setting item associated with each digit of the setting value array information DL differs depending on the job type. According to the first preferred embodiment, the job identification information Da is attached to the tally information D2. The tally service server 5 determines the job type based on the job identification information Da, and generates the stored information D3 for each job type. The stored information D3 is preferably stored separately for each model of the image forming device 2 on the tally service server 5. That is why the model identification information Db is attached to the tally information D2. The tally service server 5 determines the model of the image forming device 2 based on the model identification information Db, and generates the stored information D3 for each model of the image forming device 2.

Figure 11:
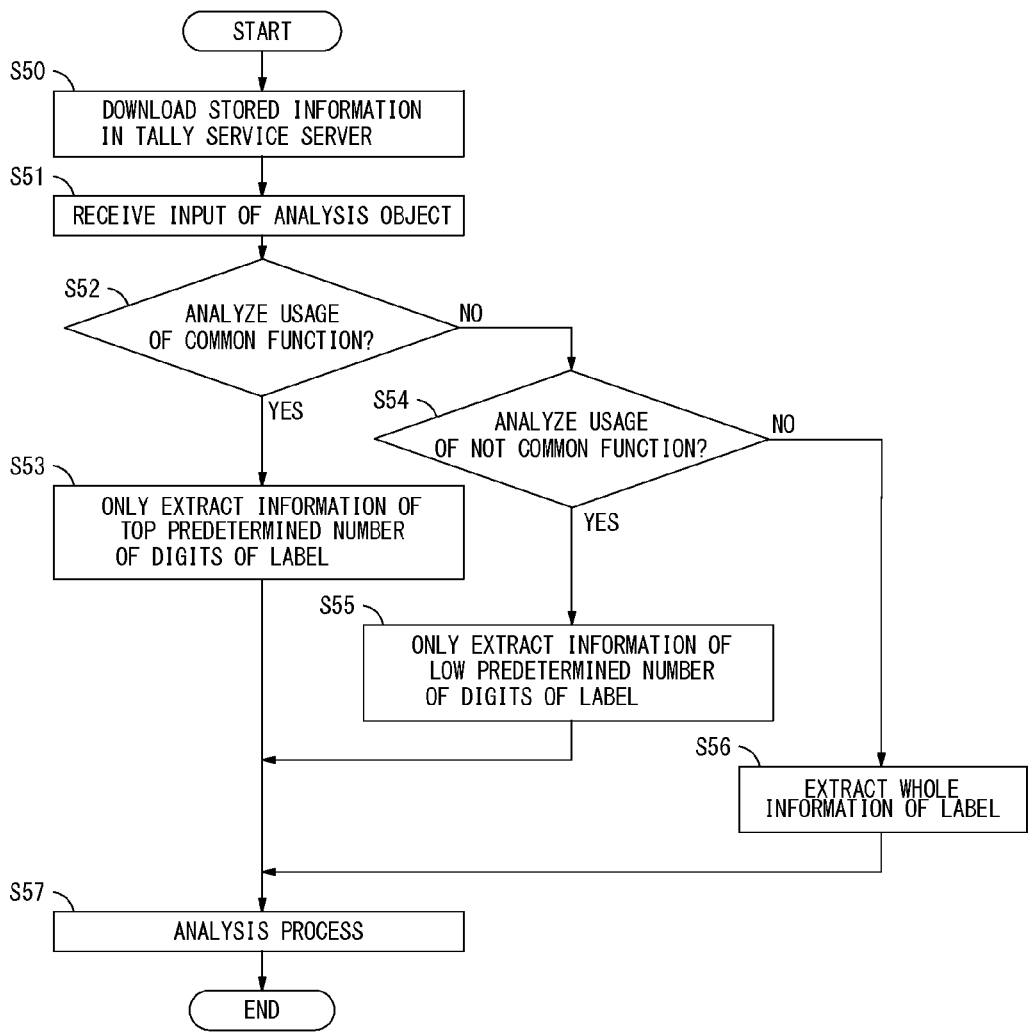
FIG. 11 is a flow diagram explaining an exemplary sequential procedure performed on an analysis device.

The exemplary sequential procedure of the process performed when the analysis device 7 downloads the stored information D3 in the tally service server 5 and analyzes. FIG. 11 is a flow diagram explaining an exemplary sequential procedure performed by the analysis device 7. The analysis device 7 executes a predetermined program installed in advance, thereby performing the process based on each sequential procedure shown in FIG. 11. Upon the start of this process, the analysis device 7 downloads and stores the stored information D3 from the tally service server 5 in the predetermined storage unit (step S50). The analysis device 7 receives the input to specify an object of the analysis by the user (step S51). The analysis device 7 determines whether or not the object of the analysis specified by the user is the analysis of the usage of the function common to the multiple types of the image forming devices (step S52). When the object of the analysis is the analysis of the usage of the common function (when a result of step S52 is YES), the analysis device 7 only extracts the information of the top predetermined number of digits of each label included in the storage information D3, and discards the other information (step S53). Thus, the analysis device 7 is allowed to only extract the setting value of the setting item relating to the common function commonly included in the multiple types of the image forming devices 2. The object of the analysis is not the analysis of the usage of the common function (when a result of step S52 is NO) and may be the usage of the not common function (when a result of step S54 is YES). In such a case, the analysis device 7 only extracts the information of the low predetermined number of digits of each label included in the storage information D3, and discards the other information (step S55). Thus, the analysis device 7 is allowed to only extract the setting value of the setting item relating to the not common function not commonly included in the multiple types of the image forming devices 2. The object of the analysis may not be even the usage of the not common function (when a result of step S54 is NO). In this case, the analysis device 7 extracts whole information of each label included in the storage information D3 (step S56). To be more specific, in this case, the analysis which narrows down to the certain function such as the common function or the not common function is not carried out. The analysis on the overall functions included in various types of the image forming devices 2 is carried out. The analysis device 7, therefore, extracts the setting values of all setting items. The analysis device 7 carries out analysis based on the setting value of the setting item extracted in steps S53, S55 or S56 (step S57). In the analysis, the tally process for each setting value of the extracted setting item, for example, is performed. Information such as the function, the setting item and the setting value regularly configured by each user is analyzed.

As described above, the image forming system 1 of the first preferred embodiment allows communication with the tally service server 5 which keeps a tally by adding on the count-up value to the count value of each tally item included in the tally information D2 received over the network. The information processing device 3 of such image forming system 1 applies the setting configured by the user to the image forming device 2, and causes the image forming device 2 to execute the job as applying the setting. With causing the image forming device 2 to execute the job, the information processing device 3 generates the setting value array information DL in which the setting value of each of the multiple setting items relating to the job is arranged in the predetermined order and combined into one piece. Also, the information processing device 3 generates the tally information D2 setting the setting value array information DL as one tally item, and sends to the tally service server 5. As described above, the setting value array information DL including the setting values of multiple setting items is taken as one tally item on the tally service server 5. Thus, the setting values of multiple setting items are put together and counted the count-up value on the tally service server 5. This may control not to have high usage fee of the tally service server 5. As described above, the stored information D3 stored in the tally service server 5 is analyzed by the analysis device 7 so that much better user interface may be constructed by improving the program 15 or the job setting screen installed on the information processing device 3, for example.

For sending the tally information D2 to the tally service server 5 by generating it, the information processing device 3 adds the job identification information Da showing the job type which is executed by the image forming device 2 to the tally information D2. The tally service server 5 is allowed to put the setting value array information DL including the setting values of multiple setting items for each job type executed by the image forming device 2 together and keep a tally.

Furthermore, for sending the tally information D2 to the tally service server 5 by generating it, the information processing device 3 adds the model identification information Db for identifying the model of the image forming device 2 to which the job is sent. The tally service server 5 is allowed to put the setting value array information DL including the setting values of multiple setting items for each model of the image forming device 2 which executed the job together and keep a tally.

As described above, the tally information with which the tally service server adds "1" to the count value by taking the setting value array information which includes multiple setting items as one setting item is allowed to be generated. Even when the general tally service server is used, for example, the tally service server may be easier to be used.
(Second Preferred Embodiment)

Figure 12:
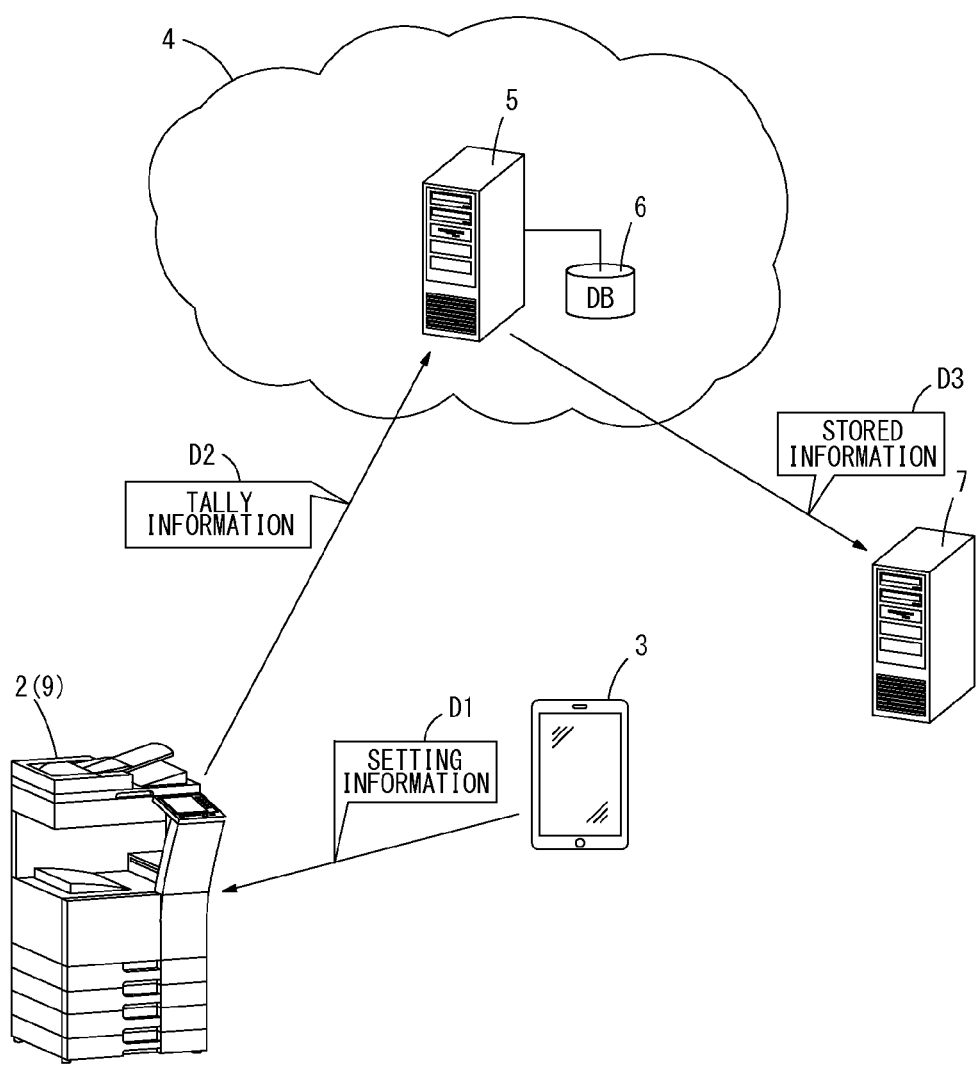
FIG. 12 shows an exemplary configuration of the image forming system of a second preferred embodiment.

The second preferred embodiment is described next. FIG. 12 shows an exemplary configuration of the image forming system 1 of the second preferred embodiment. The image forming device 2 of the image forming system 1 of the second preferred embodiment serves as the aforementioned control device 9 as illustrated in FIG. 12. To be more specific, after the information processing device 3 sends the setting information D1 to the image forming device 2, the image forming device 2 serves as the control device 7 to apply the setting configured by the user of the information processing device 3, thereby executing the job with applying the setting. The image forming device 2 serves as the control device 9 executes the job received from the information processing device 3. In response to executing the job, the image forming device 2 generates the setting value array information DL in which the setting value of each of the multiple setting items relating to the job is arranged in the predetermined order and combined into one piece. The image forming device 2 then sends the tally information D2 in which the setting value array information DL is set as one tally item to the tally service server 5. On the image forming device 2, at least the job controlling part 22 and the tally information processing part 23 of the control functioning part 20 as illustrated in FIG. 2 are brought into operation to function on the CPU which is not shown in FIG. 12. The configurations and operations of the respective job controlling part 22 and tally information processing part 23 are the same as ones described in the first preferred embodiment.

Figure 13:
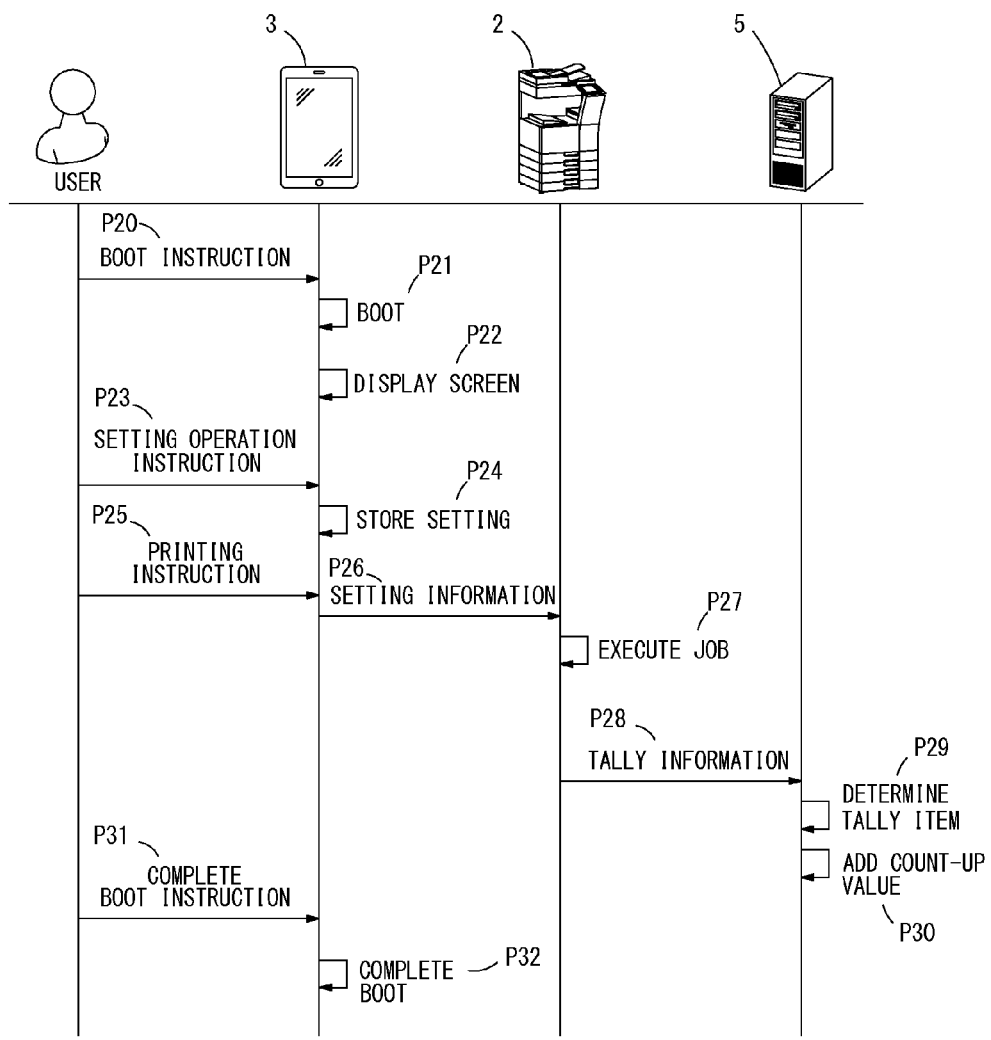
FIG. 13 is an exemplary sequential procedure of the process performed when the information processing device sends the job to the image forming device in the second preferred embodiment.

FIG. 13 is an exemplary sequential procedure of the process performed when the information processing device 3 sends the job to the image forming device 2. After the user of the information processing device 3 gives the instruction to boot the program 15 on the information processing device 3 (process P20), the information processing device 3 boots the program 15 to bring the control functioning part 20 which operates in cooperation with the image forming device 2 into operation to function (process P21). The control functioning part 20 brings the display controlling part 21 into operation to function. The display controlling part 21 displays the screen on which the user is allowed to select the function or configure the job setting on the display unit 13 of the information processing device 3 (process P22). After the user makes the job setting operation to the information processing device 3 (process P23), the display controlling part 21 stores the setting and updates the job setting screen (process P24). In response to receiving the job execution instruction by the user (process P25), the display controlling part 21 sends the setting information D1 to the image forming device 2, thereby sending the job (process P26). The job controlling part 22 is brought into operation to function on the image forming device 2 to apply the setting relating to the job configured by the user of the information processing device 3 based on the setting information D1 received from the information processing device 3, and executes the job (process P27).

When the image forming device 2 executes the job, the tally information processing part 23 of the image forming device 2 is brought into operation to function. The tally information processing part 23 generates the tally information D2 based on the setting information D1 received by the image forming device 2, and sends the generated tally information D2 to the tally service server 5 (process P28). In response to receiving the tally information D2 from the image forming device 2, the tally service server 5 determines the tally item based on the information set as the label of the tally information D2 (process P29), and adds "1" to the count value corresponding to each tally item (process P30). After detecting the instruction to complete boot of the program 15 by the user (process P31), the information processing device 3 completes boot of the program 15 on the information processing device 3 (process P32).

As described above, the image forming device 2 of the second preferred embodiment has a function to send the tally information D2 to the tally service server 5. In response to executing the job received from the information processing device 3, the image forming device 2 generates the tally information D2 including the setting value array information DL which is the same as the one described in the first preferred embodiment, then sends the generated tally information D2 to the tally service server 5. Thus, as the same as in the first preferred embodiment, the setting value array information DL including the setting values of the multiple setting items may be taken as one tally item by the tally service server 5. The setting values of the multiple setting items are put together and counted the count-up value on the tally service server 5. This may control not to have high usage fee of the tally service server 5.

Everything except for the points described above in the second preferred embodiment is the same as in the first preferred embodiment.
(Modifications)

While the preferred embodiments of the present invention have been described above, the present invention is not limited to the preferred embodiments. Various modifications may be applied to the present invention.

Figure 14:
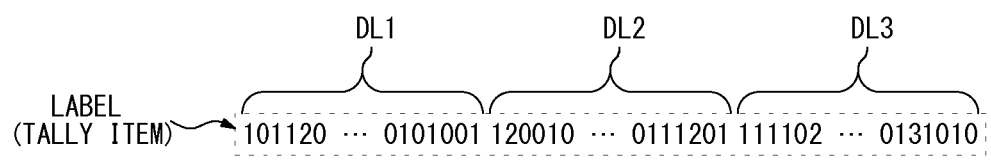
FIG. 14 shows an exemplary concept when the multiple pieces of setting value array information are set as one label.

In the first preferred embodiment described above, the tally information D2 is generated by the tally information generating part 27 for every job executed by the image forming device 2. The length of the data of the label which may be taken as the tally item by the tally service server 5 may be relatively long. In such a case, the tally information D2 having one label (tally item) as which multiple pieces of the setting value array information DL generated for the multiple jobs are set may be generated. FIG. 14 shows an exemplary concept when the multiple pieces of setting value array information DL1, DL2 and DL3 are set as one label. In the example of FIG. 14, three pieces of the setting value array information DL1, DL2 and DL3 relating to three jobs executed by the image forming device 2 are set as one label. In order to generate such label, a method as described below may be embraced, for example. After the job is sent from the information processing device 3 to the image forming device 2, the tally information processing part 23 brings the setting value arranging part 26 into operation to function. The setting value arranging part 26 arranges the setting values of the multiple setting items relating to the job in the predetermined order, and generates the setting value array information DL1. The tally information processing part 23 then brings the tally information generating part 27 into operation to function to embed the setting value array information DL1 generated by the setting value arranging part 26 in the label. The amount of information of the setting value array information DL1 may be less than the amount of information which can be embedded in the label. In this case, the tally information generating part 27 embeds the null data in the left space, and stores the label without bringing the transmission part 28 into operation to function. After another job is sent from the information processing device 3 to the image forming device 2, the tally information processing part 23 brings again the setting value arranging part 26 into operation to function. The setting value arranging part 26 arranges the setting values of the multiple setting items relating to the job in the predetermined order, and generates the setting value array information DL2. The tally information processing part 23 then brings the tally information generating part 27 into operation to function to embed the setting value array information DL2 in the region in which the null data is embedded in the stored label if it is possible. The amount of information of the setting value array information DL1 and DL2 may be less than the amount of information which can be embedded in the label. In this case, the tally information generating part 27 embeds the null data in the left space, and still stores the label. After another job is sent from the information processing device 3 to the image forming device 2, the tally information processing part 23 brings again the setting value arranging part 26 into operation to function. The setting value arranging part 26 arranges the setting values of the multiple setting items relating to the job in the predetermined order, and generates the setting value array information DL3. The tally information processing part 23 then brings the tally information generating part 27 into operation to function to embed the setting value array information DL3 in the region in which the null data is embedded in the stored label if it is possible. The amount of information of the setting value array information DL1, DL2 and DL3 may be less than the amount of information which can be embedded in the label. In this case, the tally information generating part 27 embeds the null data in the left space, and still stores the label. As shown in FIG. 14, the label in which the multiple pieces of setting value array information DL1, DL2 and DL3 are embedded may be generated. In such a case, when the tally information D2 is generated by the tally information generating part 27, the information which allows to specify the head position of each setting value array information DL1, DL2 and DL3 corresponding to each job is preferably written in the job identification information Da.

As described above, by setting the multiple pieces of setting value array information DL1, DL2 and DL3 as one label, the count value of each tally item on the tally service server 5 is allowed to be kept a smaller value. The setting value array information DL generated in response to the receipt of the job by the image forming device 2 may not be embedded in the left space of the label. In such a case, the tally information generating part 27 brings the transmission part 28 into operation to function and sends the tally information D2 stored at the time to the tally service server 5. The tally information generating part 27 then clears the label and stores the setting value array information DL generated by the setting value arranging part 26 in the head of the cleared label. The same process is performed in a repeated basis.

The information processing device 3 of the above-described first and second preferred embodiments is shown to be the portable information processing device such as the smart phone or the tablet terminal. The information processing device 3 is not necessarily the device such as the portable information processing device. The information processing device 3 may be a device formed from a device such as a general personal computer, for instance.

The image forming device 2 of the first and second preferred embodiments is shown to be one of MFPs with multiple functions such as print function, scan function and fax function, for example. The image forming device 2 is not necessarily the device such as the MFPs including multiple functions. The image forming device 2 may be a device with single function such as a printer only including print function, for instance.

In the above-described first and second preferred embodiments, either of the information processing device 3 or the image forming device 2 serves as the control device 9. The information processing device 3 or the image forming device 2 is not necessarily serves as the control device 9. The dedicated control device 9 may be installed separately from the information processing device 3 and the image forming device 2.

In the above-described first and second preferred embodiments, in order to construct more user friendly user interface by improving mainly the program 15 and/or the job setting screens installed on the information processing device 3, the tally information D2 is sent to the tally service server 5 and the setting information is stored. The above-described technique, however, is not only used for improvement of the program 15 and/or the job setting screens installed on the information processing device 3 but also for other purposes. In order to make the screens displayed on the operational panel of the image forming device 2 user friendly, for example, the above-described technique may be used. To be more specific, for executing the job based on the operation made on the operational panel, the image forming device 2 generates the setting value array information DL in which the setting values of the multiple setting items relating to the job is arranged in the predetermined order and combined into one piece. Also, the image forming device 2 generates the tally information D2 which sets at least one piece of the setting value array information DL as one tally item, and sends the generated tally information D2 to the tally service server 5. As described above, the information showing what kind of setting operation is made by each user on the operational panel may be stored on the tally service server 5. As a result, the stored information D3 may be used for improving the user interface provided by the operational panel.

What is claimed is:

1. An image forming system that allows communication with a tally service server over a network, said tally service server adding a predetermined count-up value to a count value for each tally item included in tally information received over said network, thereby keeping a tally, comprising:

an image forming device configured to execute a job; and a control device which applies a setting configured by a user to said image forming device, and causes said image forming device to execute the job with applying the setting, wherein said control device includes:

a setting value arranging part configured to arrange setting values of multiple setting items relating to the job in a predetermined order and combining into one piece, thereby generating setting value array information in response to causing said image forming device to execute the job;

a tally information generating part configured to generate tally information in which at least one piece of the setting value array information generated by said setting value arranging part is set as one tally item; and a transmission part configured to send said tally information generated by said tally information generating part to said tally service server.

2. The image forming system according to claim 1, wherein said tally information generating part generates said tally information for each job executed by said image forming device.

3. The image forming system according to claim 1, wherein said tally information generating part obtains the setting value array information generated by said setting value arranging part every time the job is executed by said image forming device, and sets multiple pieces of the setting value array information generated for each job by said setting value arranging part as one tally item, thereby generating said tally information.

4. The image forming system according to claim 1, wherein said image forming device is capable of executing multiple types of jobs corresponding to the respective multiple functions, and said tally information generating part adds job identification information showing the type of the job executed by said image forming device to said tally information.

5. The image forming system according to claim 1, wherein said setting value arranging part arranges the setting value of the setting item which is common to multiple types of said image forming devices from a head side of the setting value array information one after another.

6. The image forming system according to claim 1, further comprising:

an information processing device which is capable of establishing communication with said image forming device, wherein said information processing device sends setting information relating to the job to said image forming device, and causes said image forming device to execute the job.

7. The image forming system according to claim 6, wherein said control device is included with said information processing device.

8. The image forming system according to claim 6, wherein said control device is included with said image forming device.

9. The image forming system according to claim 1, further comprising: an analysis device for obtaining said tally information stored in said tally service and analyzing.

10. The image forming system according to claim 1, wherein the predetermined count-up value is a whole number.

11. The image forming system according to claim 1, wherein the multiple setting items are counted together as one tally item.

12. An information processing device which is capable of establishing communication with an image forming device which executes a job sends tally information to a tally service server that adds on a predetermined count-up value to a count value for each tally item included in said tally information, thereby keeping a tally when causing said image forming device to execute the job with applying a setting configured by a user to said image forming device, comprising:

a setting value arranging part configured to arrange setting values of multiple setting items relating to the job in a predetermined order and combining into one piece, thereby generating setting value array information in response to causing said image forming device to execute the job;

a tally information generating part configured to generate said tally information in which at least one piece of the setting value array information generated by said setting value arranging part is set as one tally item; and a transmission part configured to send said tally information generated by said tally information generating part to said tally service server.

13. The information processing device according to claim 12, wherein said tally information generating part generates said tally information for each job executed by said image forming device.

14. The information processing device according to claim 12, wherein said tally information generating part obtains the setting value array information generated by said setting value arranging part every time the job is executed by said image forming device, and sets multiple pieces of the setting value array information generated for each job by said setting value arranging part as one tally item, thereby generating said tally information.

15. The information processing device according to claim 12, wherein said tally information generating part adds job identification information showing a type of the job executed by said image forming device to said tally information.

16. The information processing device according to claim 12, wherein said setting value arranging part arranges the setting value of the setting item which is common to multiple types of said image forming devices from a head side of the setting value array information one after another.

17. The information processing device according to claim 12, wherein the predetermined count-up value is a whole number.

18. The information processing device according to claim 12, wherein the multiple setting items are counted together as one tally item.

19. A tally information transmission method of sending tally information to a tally service server which adds on a predetermined count-up value to a count value for each tally item included in said tally information, thereby keeping a tally when an information processing device which is capable of establishing a communication with an image forming device which executes a job applies a setting configured by a user to said image forming device and causes said image forming device to execute the job, comprising the steps of:
- (a) arranging setting values of multiple setting items relating to the job in a predetermined order and combining into one piece, thereby generating setting value array information in response to execution of the job by said image forming device;
- (b) generating said tally information in which at least one piece of the setting value array information generated in said step (a) is set as one tally item; and
- (c) sending said tally information generated in said step (b) to said tally service server.

20. The tally information transmission method according to claim 19, wherein the predetermined count-up value is a whole number.

21. The tally information transmission method according to claim 19, wherein the multiple setting items are counted together as one tally item.

22. A non-transitory computer readable recording medium on which a program is recorded, said program executable on an information processing device capable of establishing a communication with an image forming device which executes a job, and sending tally information to a tally service server which adds on a predetermined count-up value to a count value for each tally item included in said tally information, thereby keeping a tally when said information processing device applies a setting configured by a user to said image forming device and causes said image forming device to execute the job, said program causing said information processing device to execute the steps of:
- (a) arranging setting values of multiple setting items relating to the job in a predetermined order and combining into one piece, thereby generating setting value array information in response to execution of the job by said image forming device;
- (b) generating said tally information in which at least one piece of the setting value array information generated in said step (a) is set as one tally item; and
- (c) sending said tally information generated in said step (b) to said tally service server.

23. The non-transitory computer readable recording medium according to claim 22, wherein
in said step (b), said tally information is generated for each job executed by said image forming device.

24. The non-transitory computer readable recording medium according to claim 22, wherein
in said step (b), the setting value array information generated in said step (a) is obtained every time the job is executed by said image forming device, and multiple pieces of the setting value array information generated for each job in said step (a) are set as one tally item, so that said tally information is generated.

25. The non-transitory computer readable recording medium according to claim 22, wherein
in said step (b), job identification information showing a type of the job executed by said image forming device is added to said tally information.

26. The non-transitory computer readable recording medium according to claim 22, wherein
in said step (a), the setting value of the setting item which is common to multiple types of said image forming devices is arranged from a head side of the setting value array information one after another.

27. The non-transitory computer readable recording medium according to claim 22, wherein the predetermined count-up value is a whole number.

28. The non-transitory computer readable recording medium according to claim 22, wherein the multiple setting items are counted together as one tally item.

* * * * *